United States Patent
Aponte Luis

(10) Patent No.: US 10,672,246 B2
(45) Date of Patent: Jun. 2, 2020

(54) DEVICE, SYSTEM AND METHOD FOR DETECTING EMERGENCIES IN PUBLIC FACILITIES BUILDING, VEHICLES AND TRANSPORT NETWORKS

(71) Applicant: ONTECH SECURITY, SL, La Rinconada, Seville (ES)

(72) Inventor: Juan Aponte Luis, Seville (ES)

(73) Assignee: ONTECH SECURITY, SL, La Rinconada, Seville (ES)

( * ) Notice: Subject to any disclaimer, the term of this patent is extended or adjusted under 35 U.S.C. 154(b) by 0 days.

(21) Appl. No.: 16/314,646

(22) PCT Filed: Jun. 29, 2017

(86) PCT No.: PCT/ES2017/070477
§ 371 (c)(1),
(2) Date: Dec. 31, 2018

(87) PCT Pub. No.: WO2018/002406
PCT Pub. Date: Jan. 4, 2018

(65) Prior Publication Data
US 2019/0318598 A1  Oct. 17, 2019

(51) Int. Cl.
| | |
|---|---|
| G08B 17/117 | (2006.01) |
| H04W 4/90 | (2018.01) |
| G08B 17/12 | (2006.01) |
| G08B 21/02 | (2006.01) |
| G08B 25/10 | (2006.01) |
| H04W 4/021 | (2018.01) |

(52) U.S. Cl.
CPC .......... *G08B 17/117* (2013.01); *G08B 17/125* (2013.01); *G08B 21/02* (2013.01); *G08B 25/10* (2013.01); *H04W 4/021* (2013.01); *H04W 4/90* (2018.02); *G06T 2207/30232* (2013.01)

(58) Field of Classification Search
None
See application file for complete search history.

(56) References Cited

U.S. PATENT DOCUMENTS

| | | |
|---|---|---|
| 2003/0234725 A1 | 12/2003 | Lemelson et al. |
| 2005/0275549 A1 | 12/2005 | Barclay et al. |

(Continued)

FOREIGN PATENT DOCUMENTS

WO   WO2012115881 A1   8/2012

OTHER PUBLICATIONS

International Search Report, dated Oct. 6, 2017 for corresponding International Application No. PCT/ES2017/070477 with English translation.

(Continued)

*Primary Examiner* — Thomas S McCormack
(74) *Attorney, Agent, or Firm* — Intellectual Property Law Group LLP

(57) ABSTRACT

The object of the present invention generally relates to a device (100), system and method for detecting emergencies in public facilities, buildings, vehicles and transportation networks including the use of thermal imaging capture devices (104) in combination with smoke and/or gas detectors (102, 103) for monitoring and controlling personal safety in any of the mentioned public facilities, buildings, vehicles and transportation networks, regardless of where they are installed.

10 Claims, 1 Drawing Sheet

(56) References Cited

U.S. PATENT DOCUMENTS

2013/0120150 A1\* 5/2013 Aebersold ............... H01L 31/02
340/630
2013/0201025 A1  8/2013 Kamalakannan et al.
2013/0321637 A1 12/2013 Frank et al.
2015/0170503 A1  6/2015 Wedig et al.
2016/0133108 A1\* 5/2016 Bucsa .................... G08B 17/11
340/629

OTHER PUBLICATIONS

Written Opinion of the ISA, dated Oct. 6, 2017 for corresponding International Application No. PCT/ES2017/070477.

\* cited by examiner

DEVICE, SYSTEM AND METHOD FOR DETECTING EMERGENCIES IN PUBLIC FACILITIES BUILDING, VEHICLES AND TRANSPORT NETWORKS

CROSS-REFERENCE TO RELATED APPLICATIONS

This application is a U.S. National Phase application, under 35 U.S.C. § 371, of International Application no. PCT/ES2017/070477, with an international filing date of Jun. 29, 2017, and claims benefit of European Application no. 16382310.7 filed on Jun. 29, 2016, each of which are hereby incorporated by reference for all purposes.

BACKGROUND OF THE INVENTION

1. Field of the Invention

The object of the present invention generally relates to a device, system and method for detecting emergencies in public facilities, buildings, vehicles and transportation networks including the use of thermal imaging capture devices, and more particularly, for example, the use of thermal images for monitoring and controlling personal safety in any of the mentioned public facilities, buildings, vehicles and transportation networks, regardless of where they are installed.

2. Background

There is currently a trend to increase safety in buildings of any type, therefore requiring residential premises, offices and generally any facility where persons are present to have a plurality of fire detectors, smoke detectors and carbon monoxide (CO) detectors installed therein.

Therefore, the implementation of safety standards in construction imposes providing several types of devices, sensors and detectors in homes and buildings. Conventionally, a room can have a motion detector to detect the presence of persons in the room for automatically controlling lighting, a thermostat for controlling the system (HVAC), other air conditioning, ventilation and heating power sensors for controlling power consumption, a fire alarm, a smoke detector, and a CO detector. Conventional detectors and sensors of this type are unable to acquire data with the detail required for allowing high-level analysis or the detection of multiple types of events. For example, conventional passive infrared (PIR) motion detectors are built with between one and four pyroelectric cells, but these detectors are only good for detecting changes in thermal energy in a specific area and do not enable knowing about the presence of one or more persons in a real emergency situation.

Therefore, conventional devices, sensors and detectors of this type are not cost-effective, since the different devices, sensors and detectors must provide integral monitoring and control. Furthermore, even when many different devices, sensors and detectors are installed, they cannot provide the detailed data required for the surveillance and smart control of buildings. As more conventional sensors and detectors are implemented, the cost can go up exponentially, offering performances that are inferior to those required or simply insufficient.

Patent document US2013/321637, however, partially solves these problems by describing several systems and methods for monitoring and controlling the use of small infrared imaging modules to enhance occupant safety and energy efficiency of buildings and structures. In one example, thermal images captured by infrared imaging modules can be analyzed to detect the presence of persons, identify and classify the power-consuming objects, and control environmental conditions. Based on the processed thermal images, various power-consuming objects (for example, an HVAC system, lighting, water heaters, appliances and others) can be controlled to increase energy efficiency. In another example, thermal images captured by infrared imaging modules can be analyzed for detecting various hazardous conditions, such as a combustible gas leak, a CO gas leak, a water leak, fire, smoke and an electrical hotspot. If hazardous conditions are detected, an alarm can be generated and/or several objects can be controlled to remedy such conditions.

On the other hand, patent document US2013/201025 relates to a method and a system for monitoring a gas leakage incident in a facility, such as an industrial plant, and more particularly, to a method whereby a plurality of live video images are integrated and recorded, to ensure a proper response to the incident, and to facilitate subsequent review of the response in order to improve emergency personnel training.

Thermal hand-held cameras used by rescue services for entering situations in which smoke does not allow locating possible victims of the incident that originated the emergency are also known in the prior art. Nevertheless, these hand-held cameras require the immediate use thereof, with the subsequent risk for rescue personnel, in addition to making it impossible to know beforehand the situation of the persons that may already be unconscious, semi-unconscious or disoriented inside the building where the emergency has taken place.

SUMMARY OF THE INVENTION

The present invention describes a detection device for detecting emergencies in public facilities, buildings, vehicles and transportation networks including: one or more smoke detecting sensors and/or carbon monoxide (CO) detecting sensors; one or more infrared imaging sensors configured for capturing a thermal image of an area; a processor configured for: (i) processing the thermal image; (ii) detecting and identifying the presence of one or more persons in at least one target area of at least one thermal imaging sensor; and (iii) generating control signals for controlling an emergency situation at least partially based on: (a) the activation of at least one smoke detector and/or carbon monoxide detector, and (b) the presence of one or more persons detected by means of the mentioned thermal image; and a communication module configured for transmitting the control signals for controlling the mentioned emergency situation.

The main advantage of the system object of the invention is that in the event of emergency situations, particularly emergency situations due to the presence of smoke or carbon monoxide, the system allows the detection and identification of the person/persons present in a specific location resulting in an emergency area demarcated by the activation of the detectors.

Compared to the prior art, the present invention offers a series of advantages. All the mentioned patent documents (i.e. US2013/321637 and US2013/201025) include fixed television (CCTV) or thermal cameras, but they are constantly monitoring the situation of buildings at all times. In this regard, they are not warning systems per se, but rather integral surveillance systems offering the following drawbacks: (a) they require very large power consumption, which means that they must be electrically powered by means of wired installations; and (b) they violate personal privacy, which technically means that there is a need to implement an efficient personal data processing structure and to comply with all possible legal restrictions, for example, those described in Directive 95/46/EC on the protection of personal data, where compliance with said directive is compulsory in countries in the European Union.

Compared to the mentioned systems, the invention, in contrast, implements in a single device a CO gas sensor and/or a smoke sensor, and in a particular embodiment, a temperature sensor, such that only when a warning is generated in one of those sensors (smoke/carbon monoxide/thermal sensor) the thermal imaging sensor will transition to the active mode, capturing the image or recording a video of a specific area of influence which is obviously related to the anomalous situation detected by the active smoke, gas or thermal sensor.

Subsequently, with the image or images captured by the thermal camera, in the processor of the device object of the invention, an algorithm creates a thermal map of the studied area, identifying the presence or absence of persons and the possible focal spots that may have brought about activation of the smoke, gas or thermal sensor. This thermal map is telematically transmitted to a server, which acts as a physical control center and is configured for relating the thermal map transmitted by the device of the invention with a geolocation system, such that the emergency is placed on a positioning map or plan that can be sent to emergency services so that from a user terminal such as a mobile telephone or tablet, for example, the rescue personnel can establish, prior to rescue, the priorities of such rescue and the optimal access route to the emergency area, together with the images received by the thermal camera of both the prior situation and of the current situation of the emergency in real time.

An object of the present invention is the versatility of use and the universal range of use. Generally, the device object of the invention can be used in public facilities (hospitals, health centers, critical facilities, industrial facilities), buildings (homes, offices), vehicles (ships, airplanes, trucks, buses) and transportation networks (subway, tunnels, railway transportation, accident black spots on roads). In order to give the invention this universal range of use, the primary power source of the device is a rechargeable battery. Depending on the facility, this rechargeable battery will be connected to the power grid or to a solar panel or the actual power source of the vehicle in which it is installed.

The use of batteries is not obvious. As indicated, thermal cameras consume a lot of power, so an efficient electrical connection of the camera is required, especially when operation is continuous in monitoring tasks. Nevertheless, in emergency situations it is logical to think that the first thing to go is the electric power supply, so an independent power supply which allows operation to continue regardless of the emergency situation and which, combined with a strong shell, allows being used as a "black box" in the incident, is required.

The scope of the invention is defined by the claims which are incorporated in this part of the specification by reference to same.

Throughout the description and claims the word "comprises" and variants thereof do not seek to exclude other technical features, accessories, components or steps. For those skilled in the art, other objects, advantages and features of the invention will be deduced in part from the description and in part from putting the invention into practice. The following examples and drawings are provided by way of illustration and do not seek to limit the present invention. Furthermore, the present invention covers all possible combinations of particular and preferred embodiments indicated herein.

BRIEF DESCRIPTION OF THE DRAWINGS

A series of drawings which help to better understand the invention and are expressly related to an embodiment of said invention presented as a non-limiting example thereof are very briefly described below.

DETAILED DESCRIPTION OF AN EMBODIMENT OF THE INVENTION

Figure 1:
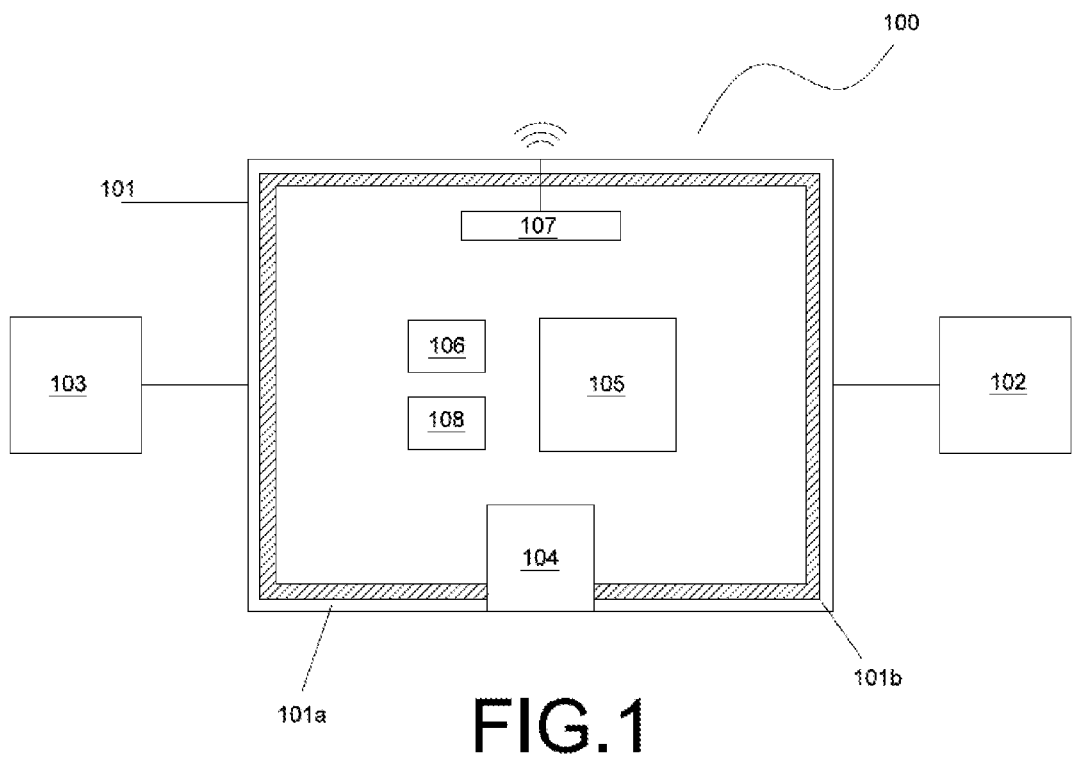
FIG. 1 shows a block diagram-type depiction of the device object of the present invention.

FIG. 1 illustrates an emergency detecting device 100 according to a preferred embodiment of the invention.

The emergency detecting device 100 comprises a shell 101 housing the different elements making up the device in the preferred embodiment thereof, except gas detecting sensors 102, 103 and, where appropriate, the temperature sensor 108. This shell 101 can have different configurations depending on the use that will be made of it, but in a particular embodiment the shell 101 comprises a protective jacket 101a configured for withstanding impact crushing, and where there is a thermal insulating layer 101b under the protective jacket. As defined above in the present specification, one object of the invention is to provide intrinsic safety features to the detecting device 100 such that it can be used as an emergency event recording box, i.e., acting like a "black box" in case of emergency.

To perform this safety function, the shell 101 must be made from a material that can overcome the following tests: an impact test in which the detector 100 is shot at an aluminum target with a gas gun, producing a maximum force of 3,500 kilos; a penetration resistance test in which a mass of 225 kilos provided with a tempered steel tip is dropped on detector 100 from a height of three meters; a static crushing test in which an actuator applies a compression of 2,300 kiloponds; an immersion test at a considerable depth (this will depend on if it is used in buildings or in means of transport), in which the detector 100 must withstand 24 hours in a chamber filled with pressured salt water; and finally a test to check its fire-resistant features, in which the detector 100 is subjected to flames at 1,100° C.

Generally, the shell 101 is made from fire-resistant and impact resistant IK rated materials as provided in European standard EN62262.

The shell 101 by itself does not allow being used as a "black box" of the detecting device 100, so it is necessary to implement a rechargeable electric battery 109 that keeps the detector 100 working while the emergency continues and regardless of whether or not the main power supply has been cut off.

The detecting device 100 comprises one or more gas detecting sensors 102, 103 consisting of: a smoke detector 102, or a carbon monoxide detector 103, or the combination of a smoke detector 102 and a carbon monoxide detector 103. The expression combination of a smoke detector and carbon monoxide detector is understood to be both a single module combining both functionalities, and a module containing both detectors 102, 103 working together.

Smoke detectors 102 are well-known in the prior art, and in some cases they also include carbon monoxide (CO) detectors. Generally, smoke detectors 102 can be of two types: optical detectors and ionization detectors.

Optical smoke detectors 102 can be of two types, according to whether they detect smoke due to the obscuration or due to the scattering of air in a given space. Therefore, the infrared ray detectors are made up of an emitting device and another receiving device. When the space between them becomes obscured due to smoke, only a fraction of the light emitted reaches the receiver, causing the electric signal that is produced by it to be weaker, and the alarm is activated. In addition, in spot-type optical detectors the emitter and receiver are housed in the same chamber, but they do not see each other since their axes form an angle exceeding 90° and they are separated by a screen, such that the emitted ray does not reach the receiver. When smoke enters the chamber, the emitted light beam is refracted in the smoke particles and can reach the receiver, activating the alarm. Finally, laser-type detectors detect the obscuration of a particle clustering chamber with laser technology.

Furthermore, the detector 100 implements a program with instructions configured for detecting when there is smoke and when there is dust or dirt. Therefore, by means of mathematical calculations, it verifies with several variables if there is smoke or dirt, performing a self-verification before being activated and sending the signal for activating the thermal sensor 104.

Ionization smoke detectors 102 are less expensive than optical detectors and can detect particles that are too small to have an effect on light. The ionization chamber of these alarms contains a negligible amount (less than 1 microgram) of americium-241 (241Am), which emits alpha radiation. This radioactive isotope emits alpha particles (high-energy helium nuclei) over centuries. Due to the high air ionization capacity of alpha particles, about 7 cm of air, or a sheet of paper, are enough to absorb these particles. The radiation passes through a chamber open to air in which there are two electrodes, allowing a small and constant electric current. If smoke enters that chamber, air ionization is reduced and the current decreases or is even interrupted, so the alarm is activated. When smoke enters the ionization chamber, alpha particles are virtually immobilized by the combustion products, considerably decreasing the electric current. The working of these detectors is based on decreasing the conductivity of air. One chamber in the detector allows contact between the americium and the environment. Said air is ionized by the presence of alpha particles resulting from the breakdown of 241Am nuclei and therefore becomes conductive again, thereby closing a circuit. The presence of other non-ionized particles reduces conductivity inside the chamber, interrupts the circuit and allows the alarm to go off. It should be pointed out that the amount of americium present in these detectors does not endanger the health of people. These alarms were taken off the market because they require special handling in terms of waste management that is more expensive than others.

Generally, in the European Union smoke detectors 102 must comply with standard EN 54.

Carbon monoxide detectors 103 can be of two types: infrared detectors or chemical detectors. NDIR (non-dispersive infrared sensors, which are a simple spectroscopic device commonly used as a fire and gas detector) are spectroscopic sensors used to detect CO in a gas environment due to the absorption feature thereof. The main components are an infrared source, a light tube, an interference (wavelength) filter, and an infrared detector. Gas is pumped or diffused into the light tube, and the electronics measures absorption of the wavelength that is characteristic of the light. NDIR sensors are the most widely used sensors for measuring carbon monoxide.

Chemical CO gas sensors with sensitive polymer-based layers have the main advantage of consuming very little power, and they can be of a smaller size in order to fit in microelectronics-based systems, so the detector 100 preferably, but not exclusively, integrates a chemical technology-based carbon monoxide detector 103, although it must be recalibrated every so often.

Smoke detectors 102 and carbon monoxide detectors 103 in a particular embodiment can be complemented with a temperature detector 108, such that the type of emergency involved can be more precisely assessed, for example, smoke without heat but with dioxide, heat without smoke with dioxide, dioxide without heat without smoke, and all the possible combinations, since each of them is indicative of an emergency type or profile, and such information is very useful for rescue services.

The detector 100 essentially comprises one or more thermal imaging sensors 104, where said thermal imaging sensors 104 are configured for capturing a thermal image of a surveillance area 200, where the surveillance area 200 is defined by the field of view of the thermal imaging sensor 104 and coincides with the detection range of the gas sensors 102, 103. In other words, the space or area where the range of the sensors 102, 103, 108 is established must coincide with the field of view of the thermal camera or thermal imaging sensor 104.

As can be seen, the detecting device 100 comprises at least one infrared imaging module 104 (for example, an infrared camera or an infrared imaging device). The expressions "infrared camera", "infrared imaging devices", "thermal camera" or "thermal vision device" will be used interchangeably herein to define this infrared thermal imaging module 104. In any case, reference number 104 always refers to the same object regardless of the synonym used in the wording.

As indicated, the thermal camera 104, together with the electronic circuit 105, 106, 107 are housed in the shell 101 which, due to its protective jacket and fire-resistant features, allows the camera 104 to work once any of the detecting sensors 102, 103, 108 has been activated. It must be observed that the activation of the thermal camera 104 is automatic when a detector 102, 103, 108 is activated, but deactivation must be done manually or remotely from the server 300. This is the case due to the intrinsic safety the system must comprise. As indicated above, none of the detecting sensors 102, 103, 108 is covered by the shell 101 since they are preferably distributed and connected with the detecting device 100 which acts like a central node. This configuration is advantageous because the shell 101 must comprise maximum tightness and protective jacket features. If the sensors were located inside it, they would not be able to perform their function. Furthermore, this makes the assembly versatile since it is possible to cover a larger area with the same detector 100. Nevertheless, in the event of activation of a sensor 102, 103, 108, the thermal camera 104 must capture as many images as possible and will only stop recording when the central server verifies that the emergency situation is controlled, or it can be stopped manually. In other words, deactivation of the sensor 102, 103, 108 brought about by the alarm cannot automatically stop the recording because, a priori, it may be because the sensor 102, 103, 108 itself has been physically damaged or communication with the detector 100 has been cut off.

The shell 101 houses a thermal camera 104 and the electronic control circuit comprising: a memory 105, one or more processors 106, a wireless communication module 107, and one or more programs stored in the memory 105 and configured for being run by means of the processor or processors 106; and where the programs comprise instructions for performing a series of vital functions for detecting the emergency situation, which are described in detail below.

The processor or processors 106 can be implemented like any suitable processing device, for example, a logic device, a microcontroller, a processor, an application-specific integrated circuit (ASIC), or another similar or equivalent device.

The memory 105 must be a flash-type memory with a storage capacity suitable for the program or programs implemented in the detecting device 100, and for the secure storage of the thermal images captured by the thermal camera 104.

The first function to be implemented is the activation of at least one thermal imaging sensor 104 when at least one fire and gas detecting sensor 102, 103 is activated. In other words, the thermal camera 104 is only active when needed, in case of emergency, preventing power supply problems (since they are elements that consume a lot of power), and especially problems relating to the privacy of those persons 201 in the field of view of the thermal camera 104 or surveillance area 200.

Once the thermal camera 104 is activated, at least one thermal image related to the surveillance area 200 of the fire and gas detecting sensor 102, 103 that has activated the thermal imaging sensor 104 must be captured. Obviously, the thermal camera 104 must focus on the area of detection of the gas detecting sensors 102, 103 in order to know exactly what is happening and why.

The thermal image captured in the surveillance area 200 is then processed. The purpose of processing the image is to precisely detect and identify the presence of one or more persons 201 in the surveillance area 200 by analyzing the captured thermal image. It is possible to distinguish between states of consciousness, semi-unconsciousness and unconsciousness by analyzing the movement of the body in successive image captures depending on the thermal footprint of the body. This information is vital for making rescue decisions in emergency situations and will be communicated to the server 300 in real time.

Images are sent in real time. To that end, the detecting device 100 sends a warning message that can be understood by an external server 300 through the wireless communication module 107, where said message comprises at least: one unique identifier code of the detecting device 100 that originated the signal; one identifying code of the fire and gas detector 102, 103 that is active; and at least one processed thermal image of the surveillance area 200 where the activation of at least one fire and gas detector 102, 103 has taken place.

Additionally, if the presence of one or more persons detected by means of the thermal image is indicated in the processed thermal image, a priority code, depending on if the detected person 201 is unconscious, semi-unconscious or disoriented, is included.

Figure 2:
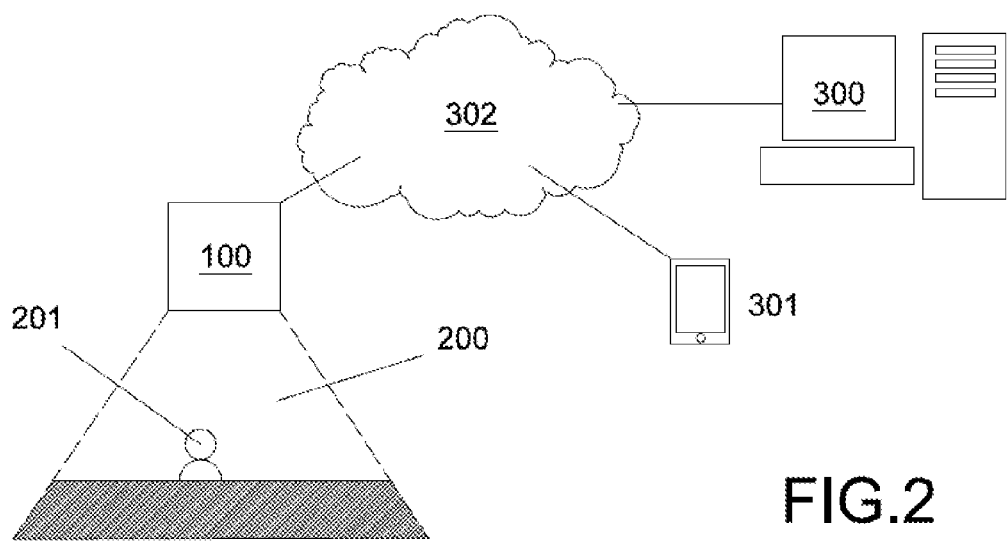
FIG. 2 shows a depiction of the communications between the different elements making up the system object of the present invention, including at least one device like the one shown in FIG. 1.

As shown in FIG. 2, the emergency detection system for detecting emergencies in public facilities, buildings, vehicles and transportation networks comprises at least one detecting device 100 like the described and shown in FIG. 1. Furthermore, the system incorporates a server 300, configured as a computer including a central processing unit (CPU), a system memory, including a random access memory (RAM) and a read-only memory (ROM), and a system bus coupling the memory to the CPU. A basic input/output system containing the basic routines that help transfer information between elements located in the computer, such as during the start, for example, is stored in the ROM. The computer also includes a massive storage device for storing an operating system, application programs and other program modules, which will be described in further detail below.

The massive storage device is connected to the CPU by means of a massive storage controller (not shown) connected to the bus. The massive storage device and its associated computer-readable media provide the computer with non-volatile storage. Although the description of the computer-readable media contained herein refers to a massive storage device, such as a hard drive or a CD-ROM unit, for example, those skilled in the art will understand that the computer-readable media can be any media that can be accessed by the computer.

By way of non-limiting example, the computer-readable media can comprise computer storage media and communication means. Computer storage media include volatile and non-volatile media, extractable and non-extractable media implemented in any method or technique for storing information, such as computer-readable instructions, data structures, program modules or other data, for example. Computer storage media include, but are not limited to, the RAM, ROM, EPROM, EEPROM memories, flash memory or other solid-state memory techniques, CD-ROM, digital versatile discs (DVD) or other optical storage devices, magnetic cassettes, magnetic tapes, magnetic disc storage devices or other magnetic storage devices or any other media that can be used to store the desired information and which can be accessed by a computer.

According to various embodiments of the invention, the computer can work in a networking environment using logic connections with remote computers by means of a network 302, such as the Internet, for example. The computer can connect to the network 302 through a network interface unit connected to the bus. It will be understood that the network interface unit can also be used to connect with other types of remote computer systems and networks. The computer can also include an input/output controller for receiving and processing an input from a plurality of other devices, including a keyboard, an electronic stylus. Similarly, an input/output controller can provide an output to a display screen, a printer, or another type of output device.

As briefly indicated above, a plurality of data file and program modules can be stored in the massive storage device and in the RAM of the computer, including an operating system suitable for controlling the operation of the networking personal computer, such as the WINDOWS® operating system of MICROSOFT CORPORATION®, for example. The massive storage device and RAM can also store one or more program modules. In particular, the massive storage device and RAM can store a web browser application program. As those skilled in the art know, the web browser application program is operative for requesting, receiving, reproducing and providing interactivity with electronic documents, such as, for example, a web page formatted using HTML. The web browser application program can also be operative for running commands contained in the web page, such as, for example, commands using JAVASCRIPT language of SUN MICROSYSTEMS, INC. According to one embodiment of the invention, the web browser application program comprises the INTERNET EXPLORER web browser application program of MICROSOFT CORPORATION. However, it will be understood that other web browser application programs from other manufacturers can be used for the various aspects of the present invention, such as the FIREFOX web browser application of MOZILLA FOUNDATION, for example.

In particular, the web page can include an HTML and commands which, when represented by means of the web browser application, provide a visual representation of a program or programs stored in the computer acting as a server 300. Likewise, the commands included in the web page make it possible for a user of the computer to interact with the representation supplied by the web browser application and modify the application.

The main function of the server 300 is to establish a correspondence between the active detector or detectors 100 and the geolocation thereof for sending said coordinates, together with the information transmitted by the active detector or detectors 100, to at least one rescue terminal 301. The server 300 is therefore configured for: establishing the priority of the emergency situation (i.e., eliminating false positives or ruling out errors in the system operation), and if it is established that the emergency is real, providing the rescue terminals 301 with a georeferenced location map of the emergency; calculating and providing the rescue terminals 301 with the optimal access route to the emergency; indicating the type of emergency detected (gas, smoke, presence or absence of persons 201) and providing in real time the processed thermal images received from the detector or detectors 100.

The rescue terminals 301 can be implemented in a small portable device, such as a mobile telephone, a computer tablet device, a portable computing device, a personal digital assistant, or any other suitable mobile device.

A 2G/3G/4G or similar communication system is implemented in all the embodiments described to assure communications in case of the main communication being cut off.

Where appropriate, several embodiments provided in this disclosure can be implemented using hardware, software, or combinations of hardware and software. Also where appropriate, the various hardware components and/or software components established in this document can be combined in composite components comprising software, hardware, and/or both, without departing from the object of the present invention defined in the claims. Where appropriate, the various hardware components and/or software components established herein can be separated into sub-components comprising software, hardware, or both, without departing from the object of the present invention defined in the claims. Furthermore, where appropriate, it is contemplated that the software components can be implemented as hardware components, and vice versa.

The software according to the present description, such as non-transitory instructions, data and/or program code, can be stored in one or more non-transitory machine-readable media. It is also contemplated that the software identified herein can be implemented using one or more general-purpose or specific-purpose networking computers and/or computing systems, and/or of another type. Where appropriate, the order of the various steps described herein can be changed and/or split into sub-steps to provide the features described herein.

The embodiments described above illustrate but do not limit the invention. It must also be understood that a number of modifications and variations are possible according to the object of the present invention. Accordingly, the scope of the invention is defined only by the following claims.

The invention claimed is:

1. An emergency detection system for detecting emergencies in public facilities, buildings, vehicles and transportation networks comprising at least one emergency detecting device (100) comprising:
   one or more gas detecting sensors consisting of: a smoke detector (102); or a carbon monoxide detector (103); or the combination of a smoke detector (102) and a carbon monoxide detector (103); and
   a shell (101) housing at least the following elements: one or more thermal imaging sensors (104) wherein said thermal imaging sensors (104) are configured for capturing a thermal image of a surveillance area (200); and wherein the surveillance area (200) is defined by the field of view of the thermal imaging sensor (104) and coincides with the detection range of the gas sensors (102, 103); a memory (105); one or more processors (106); and a wireless communication module (107);
   and one or more programs stored in the memory (105) and configured for being run by means of the processor or processors (106); wherein the programs comprise instructions for:
      activating at least one thermal imaging sensor (104) when at least one fire and gas detecting sensor (102, 103) is activated;
      capturing a thermal image related to the surveillance area (200) of the fire and gas detecting sensor (102, 103) that has activated the thermal imaging sensor (104);
      processing the captured thermal image of the surveillance area;
      detecting and identifying the presence of one or more persons (201) in the surveillance area (200) by analyzing the captured thermal image; and
      sending a warning message that can be understood by an external server (300) through the wireless communication module (107), where said message comprises at least:
      one unique identifier code of the detecting device (100) that originated the signal; one identifying code of the fire and gas detector (102, 103) that is active; and one processed thermal image of the surveillance area (200) where the activation of at least one fire and gas detector (102, 103) has taken place;
   and wherein at least one emergency detecting device (100) is connected with a server (300) configured for:
   a) establishing a priority in an emergency situation; and
   b) if it is established that the emergency is real, depending on the priority established in the previous point, providing a rescue terminal (301) with at least:
      b.1) a georeferenced location map of the emergency;
      b.2) an optimal access route to the emergency depending on the geographic position of the emergency established in the preceding point;
      b.3) the type of emergency detected and providing in real time the processed thermal images received from the detector or detectors (100).

2. A method for detecting emergencies in public facilities, buildings, vehicles and transportation networks implemented in the system according to claim 1, and comprising the steps of:
   a) detecting an emergency situation in a surveillance area (200) of at least one emergency detector (100) through the activation of at least one smoke detector (102) or one carbon monoxide detector (103);

b) capturing a thermal image of the surveillance area (200) with a detected emergency situation;

c) identifying the presence of one or more persons (201) in the surveillance area (200) that originated the emergency;

d) sending to at least one rescue terminal (301) a georeferenced location map of the emergency; an optimal access route to the emergency depending on the geographic position of the emergency established in the preceding point; the type of emergency detected; and providing in real time the processed thermal images received from the emergency detector or detectors (100) that originated the emergency.

3. Computer software with instructions configured for being run by one or more processors which make the system according to claim 1 carry out the method for detecting emergencies in public facilities, buildings, vehicles and transportation networks, the method comprising the steps of:

a) detecting an emergency situation in a surveillance area (200) of at least one emergency detector (100) through the activation of at least one smoke detector (102) or one carbon monoxide detector (103);

b) capturing a thermal image of the surveillance area (200) with a detected emergency situation;

c) identifying the presence of one or more persons (201) in the surveillance area (200) that originated the emergency;

d) sending to at least one rescue terminal (301) a georeferenced location map of the emergency; an optimal access route to the emergency depending on the geographic position of the emergency established in the preceding point; the type of emergency detected; and providing in real time the processed thermal images received from the emergency detector or detectors (100) that originated the emergency.

4. The emergency detection system according to claim 1, wherein the device comprises a temperature detecting sensor (108).

5. The emergency detection system according to claim 1, wherein the shell (101) of the device (100) comprises a protective jacket (101a) configured for withstanding impact crushing; and where under the protective jacket (101a) there is a thermal insulating layer (101b).

6. The emergency detection system according to claim 4, wherein the shell (101) of the device (100) comprises a protective jacket (101a) configured for withstanding impact crushing; and where under the protective jacket (101a) there is a thermal insulating layer (101b).

7. The emergency detection system according to claim 1, wherein the device comprises a rechargeable electric battery (109).

8. The emergency detection system according to claim 4, wherein the device comprises a rechargeable electric battery (109).

9. The emergency detection system according to claim 5, wherein the device comprises a rechargeable electric battery (109).

10. The emergency detection system according to claim 6, wherein the device comprises a rechargeable electric battery (109).

* * * * *